United States Patent
Kim et al.

(10) Patent No.: US 7,510,678 B2
(45) Date of Patent: Mar. 31, 2009

(54) COMPOSITE MATERIAL FOR BIPOLAR PLATE

(75) Inventors: Hyoung-Juhn Kim, Suwon-si (KR);
Yeong-Chan Eun, Suwon-si (KR);
Sung-Yong Cho, Suwon-si (KR);
Ho-Jin Kweon, Suwon-si (KR);
Jin-Kyoung Moon, Suwon-si (KR);
Dong-Hun Lee, Suwon-si (KR);
Ju-Yong Kim, Suwon-si (KR);
Seong-Jin An, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 681 days.

(21) Appl. No.: 10/966,031

(22) Filed: Oct. 18, 2004

(65) Prior Publication Data

US 2005/0089744 A1   Apr. 28, 2005

(30) Foreign Application Priority Data

Oct. 22, 2003   (KR) .................. 10-2003-0073640

(51) Int. Cl.
*C08J 5/02* (2006.01)
*H01B 1/24* (2006.01)
*H01M 8/02* (2006.01)

(52) U.S. Cl. .................. 264/331.19; 252/511; 429/34

(58) Field of Classification Search .................. 429/34, 429/38, 39; 252/511; 264/331.19
See application file for complete search history.

(56) References Cited

U.S. PATENT DOCUMENTS

| | | | |
|---|---|---|---|
| 6,500,893 B2 * | 12/2002 | Yamada et al. | 429/34 X |
| 6,572,997 B1 | 6/2003 | Iqbal et al. | 429/34 |
| 2003/0023007 A1 * | 1/2003 | Reardon | 525/430 |
| 2003/0190516 A1 * | 10/2003 | Tanno | 429/34 |

FOREIGN PATENT DOCUMENTS

| | | | |
|---|---|---|---|
| JP | 2000-001306 | * | 1/2000 |
| JP | 2002-260682 | | 9/2002 |
| JP | 2003-86196 | | 3/2003 |
| JP | 2003-297382 | | 10/2003 |
| JP | 2003-297386 | | 10/2003 |
| WO | WO 03/079475 | | 9/2003 |

OTHER PUBLICATIONS

Computer-generated English translation of JP 2003-297386, from the Japanese Patent Office website (doc date Oct. 2003).*

* cited by examiner

*Primary Examiner*—Stephen J. Kalafut
(74) *Attorney, Agent, or Firm*—Robert E. Bushnell, Esq.

(57) ABSTRACT

A composite material for a bipolar plate of fuel cells is comprised of conductive carbon dispersed in polybenzoxazine matrix. The present invention also provides a composite material for preparing a bipolar plate for fuel cells comprising a polymer where a volume reduction percent is less than 5%, preferably 3%, and more preferably 1% after polymerization of the monomers with respect to total volume of the monomers before the polymerization thereof, and conductive carbon. The polymers of the present invention have good workability since there is little volume change during polymerization, and good mechanical and chemical properties, and they can be manufactured at a low cost.

7 Claims, 1 Drawing Sheet

COMPOSITE MATERIAL FOR BIPOLAR PLATE

CLAIM OF PRIORITY

This application makes reference to, incorporates the same herein, and claims all benefits accruing under 35 U.S.C. §119 from an application for A COMPOSITE MATERIAL FOR BIPOLAR PLATE earlier filed in the Korean Intellectual Property Office on 22 Oct. 2003 and there duly assigned Ser. No. 2003-73640.

BACKGROUND OF THE INVENTION

1. Field of the Invention

The present invention relates to a composite material for a bipolar plate, and more particularly to a composite material having chemical and mechanical stability and good workability, and that can be manufactured at a low cost, and a method of preparing a bipolar plate using the composite material.

2. Description of the Related Art

Fuel cells as electrochemical cells convert energy which is generated by an oxidation reaction of fuel to electrical energy. Fuel cells that are currently commercialized include phosphoric acid fuel cells (PAFC) and molten carbonate fuel cells (MCFC). Polymer electrolyte membrane fuel cells (PEMFC) have also been developed as highly efficient cells. FIG. 1 illustrates a schematic operation view of a PEMFC. A PEMFC comprises a membrane electrode assembly (MEA) 20 including an anode layer 10a and a cathode layer 10b and a polymer electrolyte membrane (PEM) 15 which is interposed between the two electrode layers. The membrane electrode assemblies are laminated using a bipolar plate with fluid flow channels formed thereon. The fuel cell generates electric power by providing fuel and oxidation material into an anode and a cathode respectively, and generating electric power through electrochemical reaction between the anode and the cathode.

As the polymer electrolyte of a PEMFC, a fluorine-containing polymer having an ion-exchange functional group and a group such as sulfonic acid, carbonic acid, phosphoric acid, phosphorous acid, etc. is used. A fluorine-containing polymer electrolyte membrane such as a perfluoro carbon sulfonic acid membrane (Nafion™) which is manufactured by Dupont Company has chemical stability, high ionic conductivity, and good mechanical properties, and thus is generally preferred.

A voltage generated between the anode and the cathode of one fuel cell is generally about 0.7V. Therefore, in order to obtain an appropriate available voltage (10V to 100V), a number of fuel cells need to be laminated to form a stack, and adjacent fuel cells separated by bipolar plates are preferable. The bipolar plate provides an electric connection between the cathode and the anode, and it provides the cathode with a gas flow channel and has strong corrosion resistance and gas impermeability.

The bipolar plate is typically manufactured with a mechanical process using solid graphite or metal, or by molding or a press-process of a graphite-polymer composite material. Such a bipolar plate has a problem of high manufacturing cost and limitary flexibility for stack design. The bipolar plate needs narrow gas channels in order to develop a compact portable fuel cell, but the aforementioned materials have many problems during the manufacturing process. For example, solid graphite is brittle and porous and therefore is easily broken during mechanical processing, and if it is prepared at less than a certain thickness, gas-impermeability is not obtained. Metals such as stainless steel, which is used in place of the graphite, are not preferable because of corrosion.

Therefore, polymer composite materials have recently been developed as a material for bipolar plates since they have high chemical stability, good workability, and low manufacturing cost. For example, a composite material including a fluoropolymer such as polyvinylidene fluoride (PVDF) and polytetrafluoroethylene (PTFE), or a phenol resin and conductive carbon has been researched. However, the aforementioned polymer has a problem wherein water is produced as a side product during synthesis of the polymer, and water remains in the resulting polymer.

SUMMARY OF THE INVENTION

It is an aspect of the present invention to provide an improved composite material for a bipolar plate.

It is also an aspect of the present invention to provide an improved method for preparing a composite material for a bipolar plate.

It is another aspect of the present invention to provide an improved fuel cell.

It is further an aspect of the present invention to provide a composite material for a bipolar plate having chemical and mechanical stability and good workability, and that can be manufactured at a low cost.

It is yet another aspect of the present invention to provide a method for preparing a composite material for a bipolar plate having chemical and mechanical stability and good workability, and that can be manufactured at a low cost.

It is still another aspect of the present invention to provide a fuel cell including a composite material for a bipolar plate having chemical and mechanical stability and good workability, and that can be manufactured at a low cost.

To accomplish the above and other aspects of the present invention, a composite material for a bipolar plate may be constructed with polybenzoxazine and conductive carbon.

The present invention also provides a composite material for a bipolar plate, the composite material comprising conductive carbon dispersed in a matrix of a polymer where a volume reduction percent after polymerization of the monomers is less than 5%, preferably 3%, and more preferably 1%, with respect to total volume of the monomers before the polymerization thereof, and conductive carbon.

The present invention also provides a method for preparing a composite material for a bipolar plate comprising: polymerizing monomers synthesized from aromatic diamine, formaldehyde and aromatic alcohol, or monomers synthesized from aromatic dialcohol, formaldehyde and amine; adding conductive carbon while polymerizing the monomers to obtain a mixture; and injecting the mixture into a mold for a bipolar plate during the polymerization of the monomers.

The present invention also provides a bipolar plate comprising the composite material, and a fuel cell comprising the bipolar plate.

BRIEF DESCRIPTION OF THE DRAWING

A more complete appreciation of the invention and many of the attendant advantages thereof will be readily apparent as the same becomes better understood by reference to the following detailed description when considered in conjunction with the accompanying drawing, wherein.

DETAILED DESCRIPTION OF THE PREFERRED EMBODIMENTS

Figure 1:
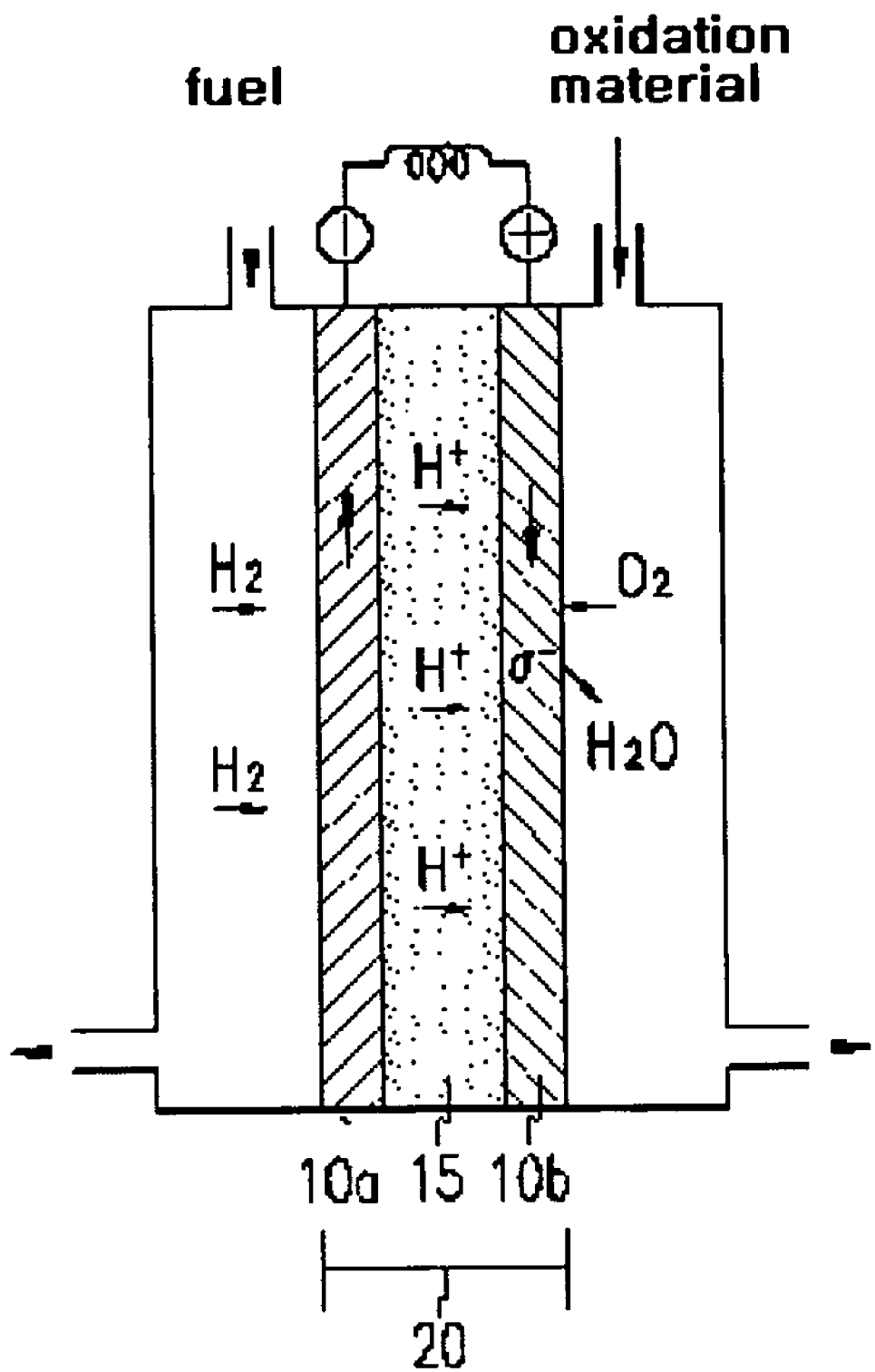
FIG. 1 is a systematic view of a polymer electrolyte fuel cell (PEFC).

In the following detailed description, only the preferred embodiment of the invention has been shown and described, simply by way of illustration of the best mode contemplated by the inventors of carrying out the invention. As will be realized, the invention is capable of modification in various obvious respects, all without departing from the invention. Accordingly, the drawing and description are to be regarded as illustrative in nature, and not restrictive.

A composite material for a bipolar plate of the present invention comprises conductive carbon which is uniformly dispersed in a polymer matrix. As the polymer, a thermosetting polymer is preferred, which has less than 5%, preferably 3%, and more preferably 1% of a volume reduction percent after polymerization of the monomers with respect to total volume of monomers before the polymerization thereof.

Examples of the polymers include polybenzoxazine, poly(propylene sulfide), polypropylene, etc. Among them, polybenzoxazine is preferred.

The conductive carbon includes carbon black, Super P (manufactured by MMM Company), ketjen black, denka black, acetylene black, thermal black, channel black, activated carbon, graphite, etc.

The weight ratio of the polymer and the conductive carbon is preferably 1.5 to 2.5:1 and more preferably, 2:1. When the weight ratio of the polymer is less than 1.5, mechanical properties are deteriorated, while, when it is more than 2.5, conductivity is deteriorated.

The polybenzoxazine is prepared by polymerization of monomers synthesized from aromatic diamine, formaldehyde and aromatic alcohol, or monomers synthesized from aromatic dialcohol, formaldehyde and aromatic amine. Examples of aromatic diamine include benzidine, examples of aromatic dialcohol include bisphenol, examples of aromatic alcohol include phenol, and examples of aromatic amine include aniline, but they are not limited thereto.

The polybenzoxazine is a thermosetting polymer prepared through ring-opening polymerization without a catalyst, and it has good mechanical and chemical properties, as well as good workability. Further, there is little volume change during polymerization. Various functional groups can be introduced to the polymer chain of polybenzoxazine so that it is suitable for a material for a bipolar plate, contrary to conventional polymers such as fluoropolymers or phenol resins.

A bipolar plate of the present invention is prepared by the following processes: adding conductive carbon while polymerizing monomers synthesized from aromatic diamine, formaldehyde and aromatic alcohol, or monomers synthesized from aromatic dialcohol, formaldehyde and aromatic amine to obtain a mixture; injecting the mixture into a mold for a bipolar plate during the polymerization of the monomers before completion of the polymerization; and then heat treating.

The mixing weight ratio of the monomers and the conductive carbon is preferably 1.5 to 2.5:1 and more preferably 2:1. Polymerization is preferably carried out at 120 to 140° C., and heat treatment is preferably carried out at 280 to 320° C.

The monomers, i.e., the benzoxazine monomers, are polymerized while being mixed with conductive carbon, and are simultaneously injected into a mold for a bipolar plate, resulting in a uniform dispersion of conductive carbon in the resultant polybenzoxazine matrix. The polymer has good workability, since the volume reduction percent of the polymer that is produced in the mold is less than 5%, preferably 3%, and more preferably 1% after polymerization of the monomers with respect to total volume of monomers before the polymerization thereof.

The benzoxazine monomers are synthesized as represented in the following schemes 1 and 2:

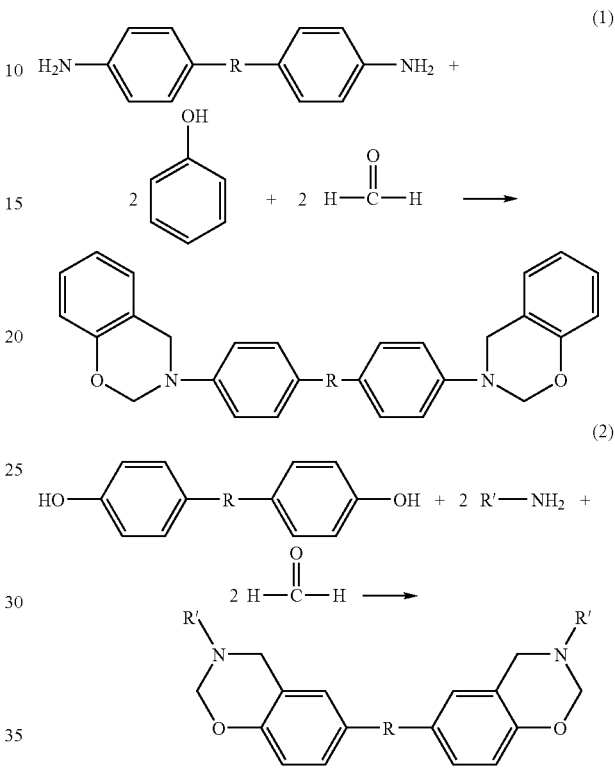

where R is single bond $CH_2$, O, S, $C(CF_3)_2$, or $SO_2$; and R' is alkyl or aryl, preferably $C_1$ to $C_6$ alkyl or $C_6$ to $C_{12}$ aryl.

In the above scheme 1, the mole ratio of diamine, formaldehyde, and alcohol is preferably 1:2:2, and in the above scheme 2, the mole ratio of dialcohol, formaldehyde and amine is preferably 1:2:2. When the mole ratio is out of the aforementioned ranges, the benzoxazine monomers need to be separated and purified before the polymerization of the monomers. Therefore, it is possible to omit a purification and separation process by regulating the mole ratio.

In the present invention, the polybenzoxazine polymer can be prepared without recovery of benzoxazine monomers. Further, a composite material for a bipolar plate can be easily obtained by injecting conductive carbon during polymerization into a mold.

The following examples further illustrate the present invention in detail, but are not to be construed to limit the scope thereof.

EXAMPLE 1

100 g (0.54 mol) of benzidine, 102 g (1.09 mol) of phenol, and 33 g of paraformaldehyde were agitated in a Brabender mixer and heated to a temperature of 130° C. for 15 minutes while agitating. 115 g of conductive carbon were added and further agitated at 130° C. for 10 minutes. Partially polymerized polybenzoxazine was input into a mold for a bipolar plate, and further polymerization reaction was carried out at 300° C. for 30 minutes to obtain a bipolar plate.

The polymer has good workability since the volume reduction percent of the polymer that is produced in a mold is less than 5%, preferably 3%, and more preferably 1% after polymerization of the monomers with respect to total volume of monomers before the polymerization thereof, which is a small change.

In particular, polybenzoxazine is a thermosetting polymer prepared through ring-opening polymerization without a catalyst, and has good mechanical and chemical properties. Various functional groups can be introduced in the polymer chain of polybenzoxazine so that it is suitable for a material for a bipolar plate, contrary to conventional polymers such as a fluoropolymer or phenol resin.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method for preparing a bipolar plate made of a composite material, comprising:
   polymerizing monomers synthesized from aromatic diamine, formaldehyde and aromatic alcohol, or from aromatic dialcohol, formaldehyde and amine;
   adding conductive carbon while polymerizing the monomers to obtain a mixture; and
   injecting the mixture into a mold for the bipolar plate during the polymerization of the monomers to obtain the bipolar plate made of the composite material comprising the conductive carbon uniformly dispersed in a polymer matrix.

2. The method according to claim 1, wherein the polymer has a volume reduction percent of less than 5% after the polymerization with respect to total volume of the monomers before the polymerization thereof.

3. The method according to claim 1, wherein the polymer has a volume reduction percent of less than 3% after the polymerization with respect to total volume of monomers before the polymerization thereof.

4. The method according to claim 1, wherein the polymer has a volume reduction percent of less than 1% after the polymerization with respect to total volume of monomers before the polymerization thereof.

5. The method according to claim 1, wherein the mixing weight ratio of the total monomers and the conductive carbon is 1.5 to 2.5:1.

6. The method according to claim 1, wherein the mole ratio of the aromatic diamine, the formaldehyde and the aromatic alcohol is 1:2:2, and the mole ratio of the aromatic dialcohol, the formaldehyde and the amine is 1:2:2.

7. The method according to claim 1, wherein the monomers are represented by one of Formulae (1) and (2):

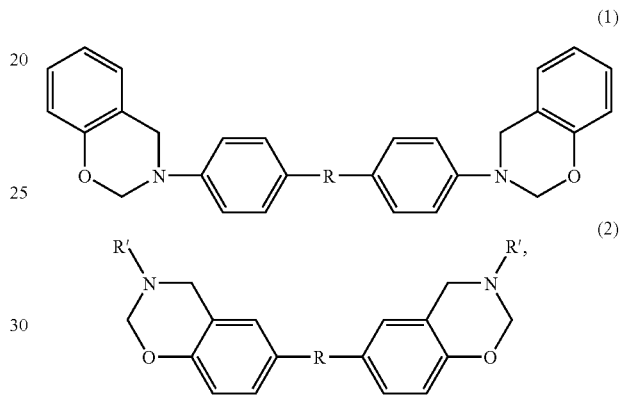

where R is single bond $CH_2$, O, S, $C(CF_3)_2$, or $SO_2$, and R' is alkyl or aryl.

* * * * *